United States Patent
Choi et al.

(10) Patent No.: US 8,970,159 B2
(45) Date of Patent: Mar. 3, 2015

(54) METHOD FOR COMPENSATING INSTANTANEOUS POWER FAILURE IN MEDIUM VOLTAGE INVERTER AND MEDIUM VOLTAGE INVERTER SYSTEM BY USING THE SAME

(75) Inventors: Jung Muk Choi, Seongnam-si (KR); Seung Ho Na, Seoul (KR); Jae Hyun Jeon, Seoul (KR); Sung Guk Ahn, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 153 days.

(21) Appl. No.: 13/615,606

(22) Filed: Sep. 14, 2012

(65) Prior Publication Data

US 2013/0076285 A1 Mar. 28, 2013

(30) Foreign Application Priority Data

Sep. 26, 2011 (KR) ........................ 10-2011-0096903

(51) Int. Cl.
- *H02P 27/04* (2006.01)
- *H02P 29/02* (2006.01)
- *H02M 1/00* (2006.01)

(52) U.S. Cl.
CPC ............... *H02P 29/022* (2013.01); *H02M 1/00* (2013.01)
USPC .......................................... 318/800; 318/801

(58) Field of Classification Search
USPC .................. 318/375, 376, 800, 801–803, 812
See application file for complete search history.

(56) References Cited

U.S. PATENT DOCUMENTS

| | | | | |
|---|---|---|---|---|
| 4,445,167 A | * | 4/1984 | Okado ..................... | 363/56.02 |
| 4,527,214 A | * | 7/1985 | Hattori et al. ................... | 361/96 |
| 5,625,545 A | * | 4/1997 | Hammond ..................... | 363/71 |
| 5,986,909 A | * | 11/1999 | Hammond et al. ............. | 363/65 |
| 6,014,323 A | * | 1/2000 | Aiello et al. .................... | 363/71 |
| 6,262,555 B1 | * | 7/2001 | Hammond et al. ........... | 318/759 |
| 6,353,545 B1 | * | 3/2002 | Ueda ............................... | 363/40 |
| 6,847,531 B2 | * | 1/2005 | Bixel ............................... | 363/71 |
| 7,088,073 B2 | * | 8/2006 | Morishita ..................... | 318/801 |
| 7,170,767 B2 | * | 1/2007 | Bixel .............................. | 363/65 |

FOREIGN PATENT DOCUMENTS

| | | |
|---|---|---|
| JP | 2002-142482 | 5/2002 |
| JP | 2005-045973 | 2/2005 |
| JP | 2011-188584 | 9/2011 |
| KR | 10-2011-0006936 | 1/2011 |

* cited by examiner

*Primary Examiner* — Rina Duda
(74) *Attorney, Agent, or Firm* — Lee, Hong, Degerman, Kang & Waimey

(57) ABSTRACT

Provided are a method for compensating instantaneous power failure in medium voltage inverter and a medium voltage inverter system by using the same, the method for compensating instantaneous power failure in medium voltage inverter including a plurality of power cells supplying a phase voltage to a motor by being connected to the motor in series, the method including decreasing an output frequency of the plurality of power cells by as much as a predetermined value at a relevant point where an input voltage of the plurality of power cells is less than a reference value, decreasing the output frequency at a predetermined deceleration gradient, and maintaining the output frequency during restoration of input voltage as long as a predetermined time, in a case the input voltage is restored.

8 Claims, 8 Drawing Sheets

METHOD FOR COMPENSATING INSTANTANEOUS POWER FAILURE IN MEDIUM VOLTAGE INVERTER AND MEDIUM VOLTAGE INVERTER SYSTEM BY USING THE SAME

Pursuant to 35 U.S.C.§119 (a), this application claims the benefit of earlier filing date and right of priority to Korean Patent Application No.10-2011-0096903, filed on Sep. 26, 2011, the contents of which is hereby incorporated by reference in their entirety.

BACKGROUND OF THE DISCLOSURE

1. Field of Endeavor

The present disclosure relates to a method for compensating instantaneous power failure in medium voltage inverter and a medium voltage inverter system by using the same.

2. Background

This section provides background information related to the present disclosure which is not necessarily prior art.

In general, an inverter interrupts a PWM (pulse width modulation) output within several ms if a power failure occurs in an input power. At this time, if a load is large in inertia, it takes a long time to accelerate the load when the power is restored. This type of operation may result in a great loss in an industrial site, and if an inverter is stopped, an instantaneous power failure compensating technique for the inverter is applied to an industrial site where a great loss is expected due to process failure.

Figure 1A:
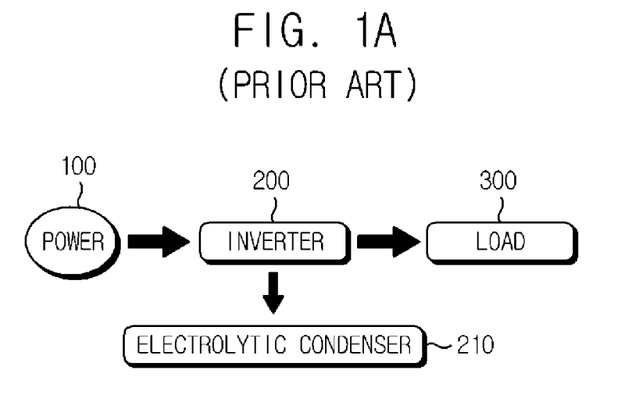
FIGS. 1a and 1b are schematic views illustrating operation of an apparatus for compensating instantaneous power failure in medium voltage inverter according to prior art.
Figure 1B:
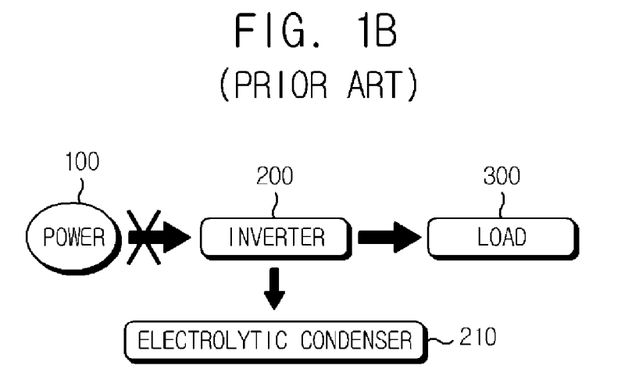

FIGS. 1a and 1b illustrate an operation of an instantaneous power failure compensating apparatus in an inverter according to prior art, where FIG. 1a illustrates the apparatus in a normal state, while FIG. 1b illustrates the apparatus when a power is interrupted.

In general, an electrolytic condenser (210) embedded in an inverter (200) (the condenser is illustrated outside of the inverter for convenience of explanation) is charged with a power from the inverter (200) in a normal state (FIG. 1a), and a load (300) is driven (FIG. 1b) using the power charged in the condenser (210), in a case the power (100) is interrupted by power failure. At this time, the inverter (200) can drive the load (300) without any interruption, because capacity of the conventional electrolytic condenser (210) is so designed as to normally operate if an instantaneous power failure is within 16 msec. However, the inverter (200) may disadvantageously stop operating in an area where power condition is not good and power failure lasts more than 16 msec, thereby creating a great loss to an industrial site.

Meanwhile, the current trend is that demand for energy saving and medium voltage inverter grows larger. As an inverter that satisfies the demand, an inverter having a cascade H-bridge (hereinafter referred to as 'CHB') structure is largely used. The inverter of CHB structure, being largely used for essential facilities at industrial sites, needs reliability as an important factor.

However, the conventional instantaneous power failure compensating apparatus as shown in FIG. 1a suffers from a disadvantage of failing to overcome the instantaneous power failure if applied with an inverter having a CHB structure, the reason of which may be summarized as below.

First, the conventional instantaneous power failure compensating apparatus cannot control a DC-link of a plurality of unit power cells in an inverter. Second, the conventional instantaneous power failure compensating apparatus uses a feedback reference voltage as a voltage command of the DC-link, and in a case the feedback reference voltage is actually applied in the medium voltage inverter, a DC-link voltage of each power cell comes to differ due to parasitic elements of capacitors, and therefore it is impossible to drive the inverter using one voltage command during actual operation. Third and lastly, the conventional instantaneous power failure compensating apparatus fails to provide a solution in consideration of external environment involving a large scale of load mounted with a medium voltage inverter having a CHB structure.

Thus, there is a need to provide a medium voltage inverter capable of solving the aforementioned disadvantages or problems.

SUMMARY OF THE DISCLOSURE

This section provides a general summary of the disclosure, and is not a comprehensive disclosure of its full scope or all of its features.

Methods and systems consistent with the present disclosure provide a method for compensating instantaneous power failure in medium voltage inverter configured to convert a mechanical kinetic energy stored in a load to an electric energy in a case an instantaneous power failure occurs in the medium voltage inverter to cope with a power failure section, enabling to continuously operate the medium voltage inverter without any interruption, and a medium voltage inverter system using the same.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a method for compensating instantaneous power failure in medium voltage inverter including a plurality of power cells supplying a phase voltage to a motor by being connected to the motor in series, the method comprising: decreasing an output frequency of the plurality of power cells by as much as a predetermined value at a relevant point where an input voltage of the plurality of power cells is less than a reference value; decreasing the output frequency at a predetermined deceleration gradient; and maintaining the output frequency during restoration of input voltage as long as a predetermined time, in a case the input voltage is restored.

In some exemplary embodiments, the method further comprises increasing the output frequency at a predetermined acceleration gradient.

In some exemplary embodiments, the step of increasing the output frequency includes increasing the output frequency to a level prior to an instantaneous power failure.

In some exemplary embodiments, the method further comprises increasing the output frequency to as much as an increased voltage, in a case voltage of the DC-link of the plurality of power cells increases.

In some exemplary embodiments, the step of decreasing the output frequency of the plurality of power cells by as much as a predetermined value includes decreasing the output frequency to make the output frequency smaller than velocity of the motor.

In some exemplary embodiments, a decreased width of the output frequency is greater than a slip frequency.

In some exemplary embodiments, the step of maintaining the output frequency includes maintaining the output frequency to make the speed of the motor smaller than the output frequency.

In another general aspect of the present disclosure, there is provided a method for compensating instantaneous power failure in medium voltage inverter including a plurality of power cells supplying a phase voltage to a motor by being connected to the motor in series, the method comprising maintaining an output frequency during restoration as long as a predetermined time, in a case an input voltage of the plurality of power cells is restored after being less than a reference value.

In still another general aspect of the present disclosure, there is provided a medium voltage inverter system, the system comprising: a plurality of power cells supplying a phase voltage to a motor by being connected to the motor in series; and a controller connected to the plurality of power cells via a network for decreasing an output frequency of the plurality of power cells by as much as a predetermined value at a relevant point where an input voltage of the plurality of power cells is less than a reference value, decreasing the output frequency at a predetermined deceleration gradient, and maintaining the output frequency during restoration of input voltage as long as a predetermined time, in a case the input voltage is restored.

In some exemplary embodiments, the controller increases the output frequency at a predetermined acceleration gradient after maintaining the output frequency as long as a predetermined time In some exemplary embodiments, the controller increases the output frequency to a level prior to an instantaneous power failure.

In some exemplary embodiments, the controller increases the output frequency to as much as an increased voltage, in a case voltage of the DC-link of the plurality of power cells increases while the output frequency is decreased at a predetermined decelerated gradient.

In some exemplary embodiments, the controller decreases the output frequency of the plurality of power cells to make the output frequency smaller than velocity of the motor.

The method for compensating instantaneous power failure in medium voltage inverter and a medium voltage inverter system by using the same according to exemplary embodiments of the present disclosure has an advantageous effect in that a mechanical kinetic energy stored in a load is converted to an electric energy, in a case an instantaneous power failure occurs in the medium voltage inverter to cope with a power failure section, enabling to continuously operate the medium voltage inverter without any interruption, to cope with an instantaneous power failure of over 16 ms which is impossible by a conventional inverter with a CHB structure.

Another advantageous effect is that property damage generated by instantaneous power failure in an inverter can be prevented to secure reliability in product processing and to enhance quality of products.

BRIEF DESCRIPTION OF THE DRAWINGS

In order to explain the principle of the present disclosure, some accompanying drawings related to its preferred embodiments are below reported for the purpose of illustration, exemplification and description, although they are not intended to be exhaustive. The drawing figures depict one or more exemplary embodiments in accord with the present concepts, by way of example only, not by way of limitations. In the figures, like reference numerals refer to the same or similar elements.

Thus, a wide variety of potential practical and useful embodiments will be more readily understood through the following detailed description of certain exemplary embodiments, with reference to the accompanying exemplary drawings in which.

DETAILED DESCRIPTION

Features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

The present disclosure is to enable a medium voltage inverter to continuously operate without any interruption, even in a case an instantaneous power failure occurs in the inverter. That is, the present disclosure is configured in such a manner that a mechanical kinetic energy stored in a load is converted and regenerated to an electric energy, in a case an instantaneous power failure occurs in the medium voltage inverter to cope with a power failure section, enabling to continuously operate the medium voltage inverter without any interruption. At this time, a DC-link voltage of power cells is changed in response to regenerated amount to avoid the power failure section through an inverter control capable of maintaining an adequate voltage.

Hereinafter, a method for compensating instantaneous power failure in medium voltage inverter and a medium voltage inverter system by using the same according to exemplary embodiments of the present disclosure will be described in detail with reference to the accompanying drawings.

Figure 2:
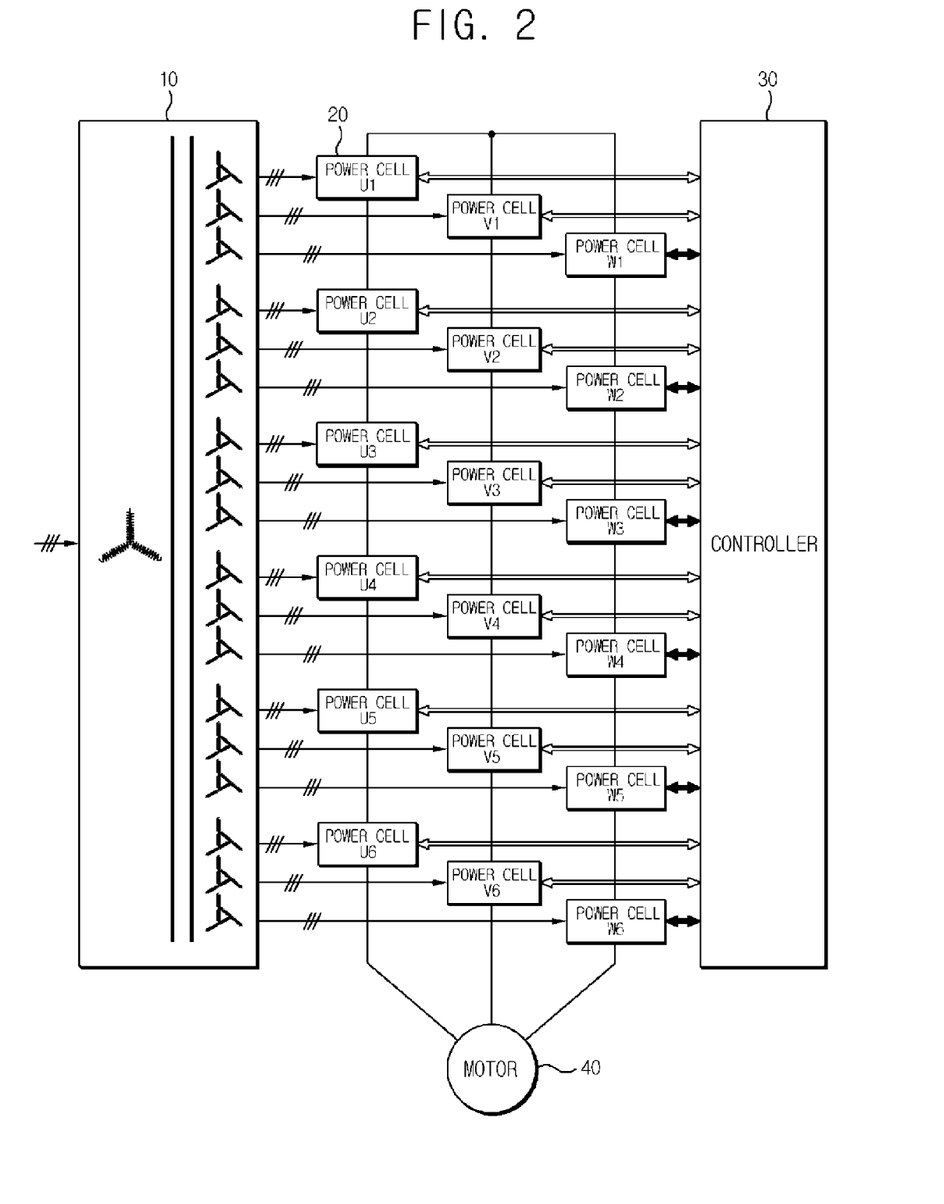
FIG. 2 is a structural view illustrating a medium voltage inverter with a CHB structure according to an exemplary embodiment of the present disclosure.

FIG. 2 is a structural view illustrating a medium voltage inverter with a CHB structure according to an exemplary embodiment of the present disclosure.

Referring to FIG. 2, a medium voltage inverter with a CHB structure includes a phase shift transformer (10), a plurality of power cells (20), a controller (30) and a motor (40). The phase shift transformer (10) shifts a phase of an input power, and supplies the phase-shifted power to a plurality of power cells (20). The phase shift transformer is well known in the art, such that no more explanation will be provided thereto.

The controller (30) is connected to each of the plurality of power cells via network, where the network may be, for example, a CAN (Controller Area Network) but it is not limited thereto. The controller (30) controls the power cells (20) through communication with the power cells (20) to perform compensation of an instantaneous power failure, details of which will be described later.

Each of the power cells (20) is a single phase inverter, connected in series and supplies a phase voltage to the motor (40). However, the plurality of power cells (20) forms a 3-phase inverter capable of obtaining a high voltage.

Although 18 power cells (20) of single phase inverter have been exemplified to explain the exemplary embodiment of the present disclosure, it should be apparent to the skilled in the art that the number of power cells (20) is not limited thereto. The motor (40) can be supplied with more power if the number of power cells (20) is increased.

Furthermore, the power cell (20) communicates with the controller (30) via network and compensates the instantaneous power failure by control of the controller (30). To this end, the power cell is embedded with a power cell controller to communicate with the controller (30). Now, detailed configuration of power cells will be described.

Figure 3:
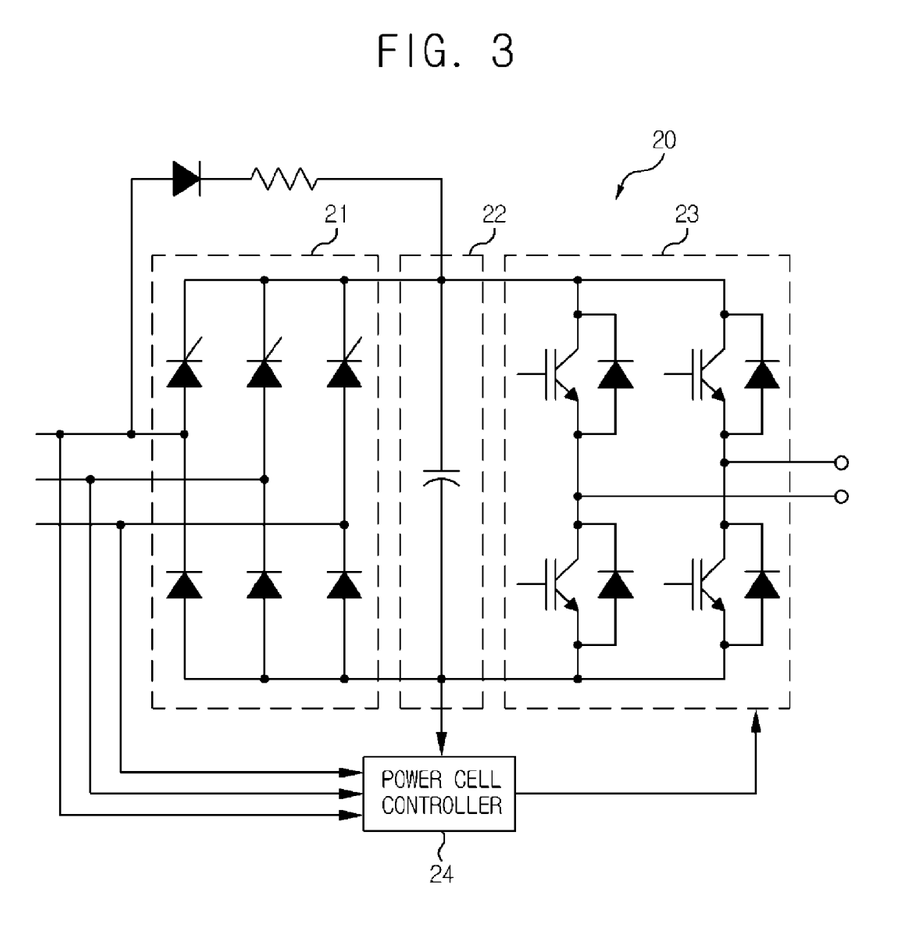
FIG. 3 is a detailed structural view of a power cell of FIG. 2 according to an exemplary embodiment of the present disclosure.

FIG. 3 is a detailed structural view of a power cell of FIG. 2 according to an exemplary embodiment of the present disclosure, where it should be apparent that configuration of each power cell is same.

Referring to FIG. 3, the power cell (20) according to the present disclosure includes a rectifying unit (21), a DC-link unit (22), an inverter unit (23) and a power cell controller (24).

The rectifying unit (21) serves to convert a 3-phase input voltage to a DC (Direct Current), and the DC-link unit (22) stores the voltage converted to DC by the rectifying unit (21). The DC-link unit (22) may also convert a rectified waveform to a stable DC through a smoothing capacitor. The inverter unit (23) switches the rectified DC to generate an AC (Alternating Current) and applies the AC to the motor (40). The inverter unit (23) performs the switching operation in response to an output frequency of the power cell controller (24), and a transistor of the inverter unit (23) may be an IGBT (Insulated Gate Bipolar Transistor), but it is not limited thereto.

Detailed explanation on operations of the rectifying unit (21), the DC-link unit (22) and the inverter unit (23) is well known to the skilled in the art, such that there will no more elaboration thereto.

The power cell controller (24) transmits voltage of the DC-link unit (22) to the controller (30), and transmits the output frequency of the inverter unit (23) in response to control of the controller (30). The output frequency of the inverter unit (23) and the voltage can be adjusted by switching control of the controller (30). That is, the power cell controller (24) transmits a control signal in response to the control of the controller (30).

Although it was impossible to equalize each voltage of the DC-link unit (22) in the plurality of power cells (20) in the conventional apparatus for compensating the instantaneous power failure, the medium voltage inverter including the plurality of power cells of FIG. 2 can equalize each voltage.

Hereinafter, a method for compensating instantaneous power failure will be described with reference to the accompanying drawings.

Figure 4:
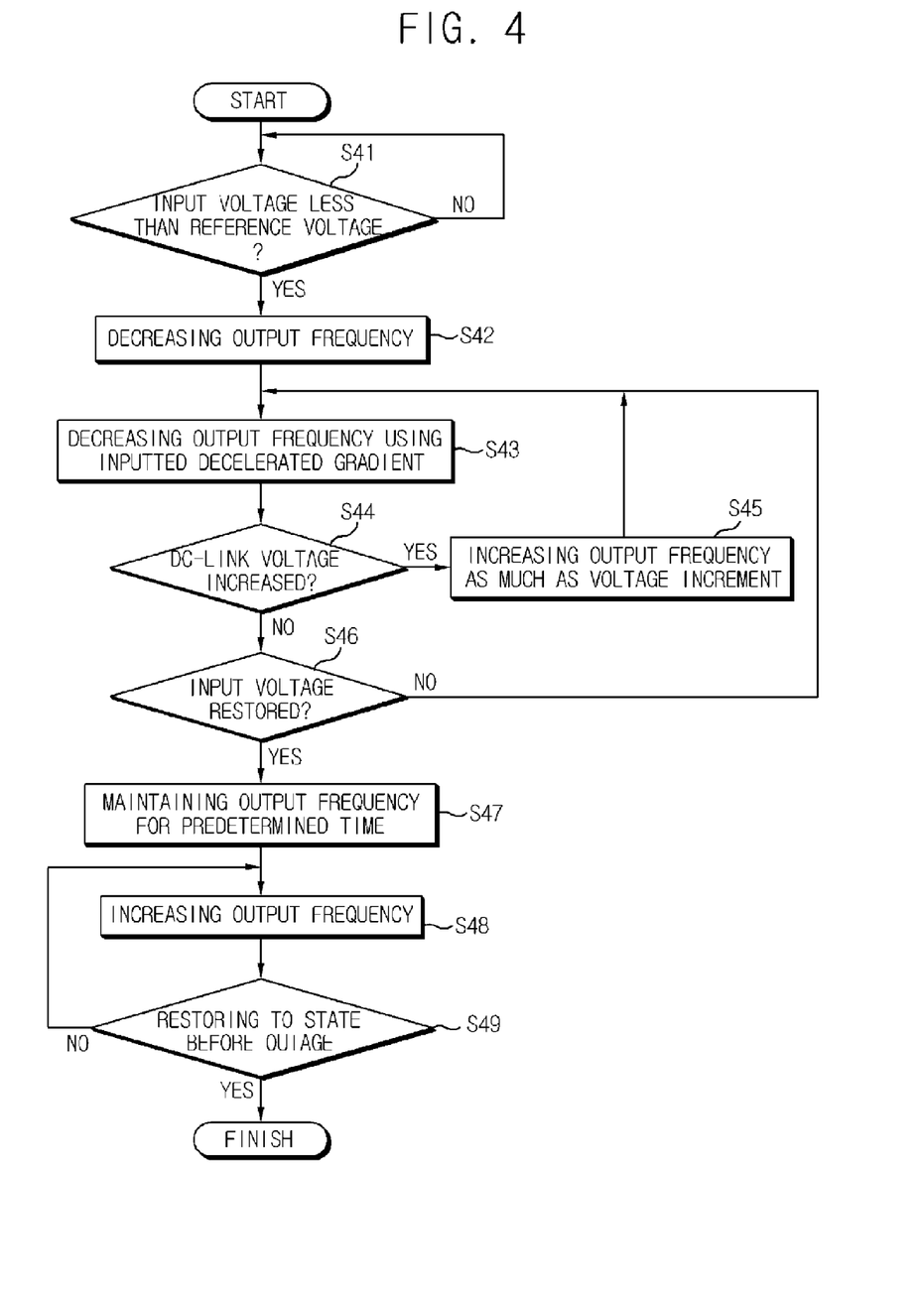
FIG. 4 is a flowchart illustrating a method for compensating instantaneous power failure in medium voltage inverter according to an exemplary embodiment of the present disclosure.

FIG. 4 is a flowchart illustrating a method for compensating instantaneous power failure in medium voltage inverter according to an exemplary embodiment of the present disclosure, where it should be apparent that the method is performed by the controller (30) of FIG. 3, as explained before.

Referring to FIG. 4, the power cell controller (24) checks an input voltage inputted to the power cell (20), and if it is confirmed that the input voltage less than a reference level is inputted to the power cell (20) (S41), the power cell controller (24) determines it as power failure, and notifies the power failure to the controller (30).

The inverter was immediately interrupted if the power failure occurs in the conventional medium voltage inverter. The interruption was caused by generation of low voltage trip prior to activation of a control loop, because capacity of the motor (40, load) is greater than capacity of a capacitor of the DC-link unit (22).

The controller (30) according to the present disclosure, in order to prevent the low voltage trip, decreases the output frequency of the inverter unit (23) to start regeneration process at the same time the instantaneous power failure occurs, that is, if a power less than the reference level is inputted (S42). By doing so, a regenerative energy can be obtained capable of controlling a power failure section at the onset of power failure through the decreased output frequency. At this time, the output frequency is preferably decreased to allow being smaller than actual velocity of the motor (40).

Subsequently, the output frequency of the inverter unit (23) is decreased using a predetermined adequate deceleration gradient relative to the load amount of load (motor, 40) (S43). The speed of the motor (40) is smaller than the output frequency outputted by the inverter unit (23) as much as a slip frequency, whereby the speed of the motor (40) is also decelerated in proportion to a gradient in which the output frequency of the inverter unit (23) is decreased. At this time, the power cell controller (24) continuously checks the voltage of the DC-link unit (22) and transmits the checked voltage to the controller (30) for prevention of generation of over-current trip. That is, in a case the voltage of the DC-link unit (22) increases due to a large amount of regeneration (S44), the controller (30) increases the decreased output frequency as much as voltage increment to consume the energy (S45).

Although an output voltage is increased to return to an existing speed command in the conventional inverter, in a case power restoration is made to allow deviating from the power failure (outage) section through increased input voltage (S46), the controller (30) according to the present disclosure maintains the output frequency (S47) during the power restoration in order to prevent generation of over-current trip due to increased inertia of the motor (40) during power restoration.

That is, the controller (30) according to the present disclosure maintains the output frequency (S47) at a restoration mode during power restoration as long as a predetermined time to prevent the inverter from exceeding an over-current limit. The maintenance time of the output frequency is preferably determined in advance in accordance with load amount of the motor (40).

Successively, the controller (30) increases the output frequency using a set acceleration gradient so that the motor (40) can return to a speed prior to the instantaneous power failure (S48). At this time, the acceleration gradient is set up in advance by a user, whereby velocity of the motor is increased to a same gradient as the acceleration gradient of the output frequency to enable the motor to return to the velocity prior to the instantaneous power failure. An instantaneous power failure compensating sequence of the controller (30) according to the present disclosure will be more clarified by the following graph of FIG. 5.

Figure 5:
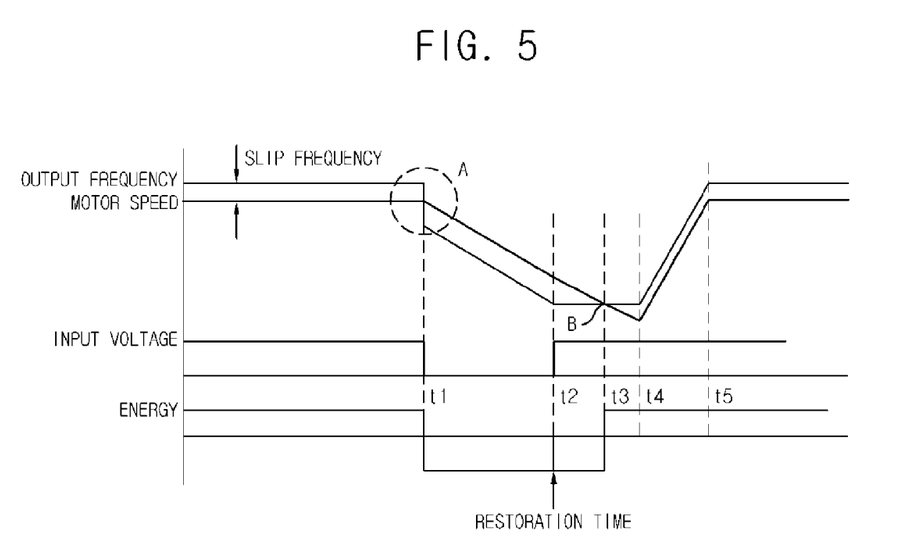
FIG. 5 is a graph illustrating a method for compensating instantaneous power failure in medium voltage inverter according to an exemplary embodiment of the present disclosure.

FIG. 5 is a graph illustrating a method for compensating instantaneous power failure in medium voltage inverter according to an exemplary embodiment of the present disclosure, where relationship in output frequency during outage occurrence, velocity of motor, input voltage and power of the motor is exemplified. Now, each step of FIG. 4 will be explained with reference to the graph of FIG. 5.

Referring to FIG. 5, an input voltage is inputted to t1 while maintaining a predetermined value. Generally, the input voltage is AC, the input voltage in FIG. 5 is defined as an rms (root mean square) value. Under a normal state, a difference between actual velocity of the motor (40) and an output frequency of the inverter (23) is called a "slip frequency".

In a case the input voltage is reduced to a reference value at t1 (S41), the controller (30) determines it as an outage, and decreases the output frequency as much as a predetermined value (S42, A part). Successively, the controller (30) at t2, which is a power restoration time, decreases the output frequency using a predetermined deceleration gradient (S43). Operation of decrease of output frequency is continuously carried out up to t2 which is the power restoration time.

In a case power restoration is made at t2 by restoration of input voltage (S46), the output frequency at the restoration time is maintained for a predetermined time (from t2 to t4) (S47). The output frequency is increased (S48) at a set acceleration gradient at t4 when the predetermined time has lapsed, and restoration to the state prior to outage is made at t5 (S49). Now, it can be noted that the output frequency is constantly maintained. At this time, the time of t3 is a time point where the output frequency of the inverter unit (23) becomes equal to the actual velocity of the motor (40). That is, the time of maintaining the output frequency may be set after a time where the output frequency of the inverter unit (23) becomes equal to the actual velocity of the motor (40), which will be explained in terms of energy consumption.

In a case the instantaneous power failure starts at t1, energy of the motor (40) is regenerated toward the inverter side to decrease the energy. At this time, if the regenerative energy is too much, an over-current trip may occur, such that V/F (voltage to frequency) ratio must be reduced. In a case restoration is made at t2, the energy up to t3 is limited because the input voltage and the output frequency are simultaneously supplied to the inverter unit (23) up to t3.

Figure 6:
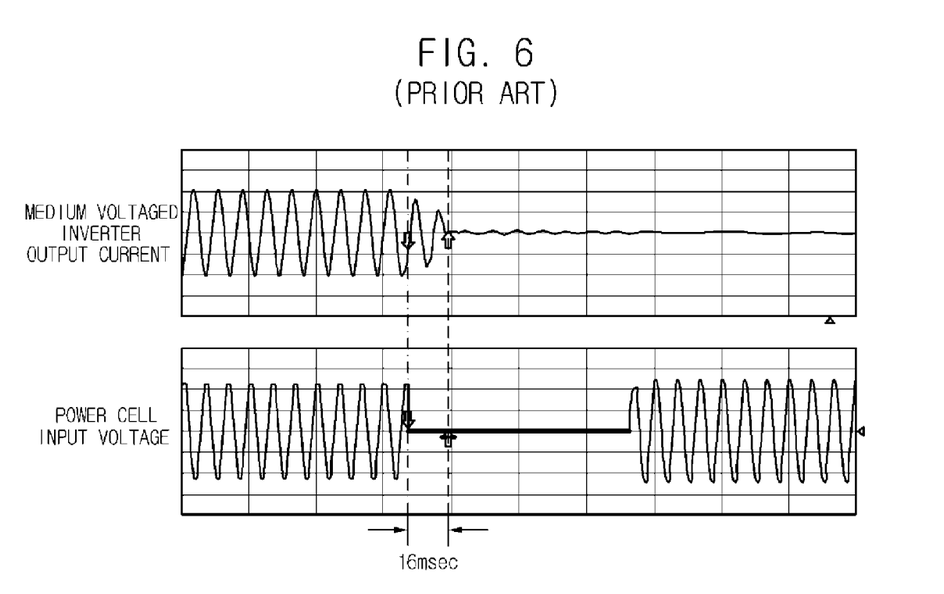
FIG. 6 is a graph illustrating a motor output current relative to an input voltage during instantaneous power failure in medium voltage inverter according to prior art.

FIG. 6 is a graph illustrating a motor output current relative to an input voltage during instantaneous power failure in medium voltage inverter according to prior art.

Referring to FIG. 6, in a case an outage occurs for more than 16 ms for the input voltage from the power cell, an output current of the medium voltage inverter becomes zero to stop the motor.

Figure 7A:
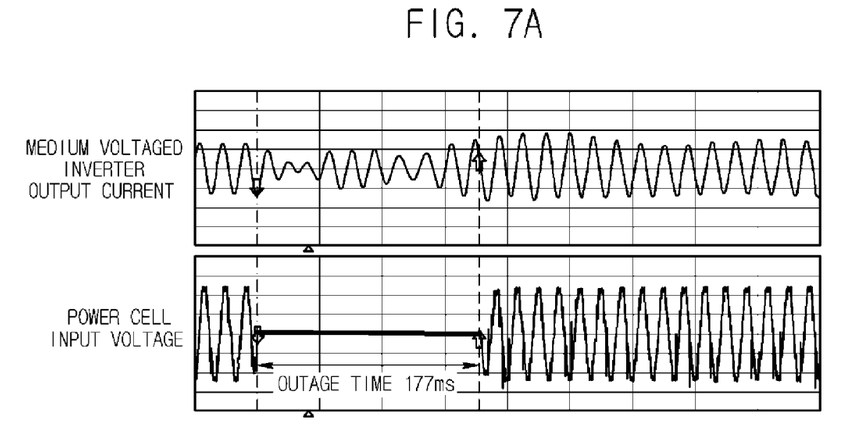
FIGS. 7a and 7b are schematic views illustrating that an output current of a medium voltage inverter is compensated by a method for compensating instantaneous power failure in the medium voltage inverter according to an exemplary embodiment of the present disclosure.
Figure 7B:
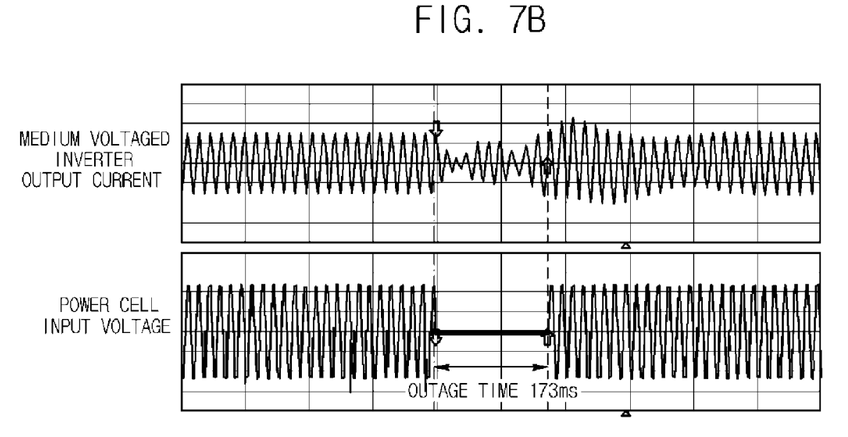

FIGS. 7a and 7b are schematic views illustrating that an output current of a medium voltage inverter is compensated by a method for compensating instantaneous power failure in the medium voltage inverter according to an exemplary embodiment of the present disclosure, showing that the motor (40) operates at 54 Hz and 56 Hz respectively, in a case the motor (40) has a load amount of 4,000 V.

Referring to FIG. 7a, it can be noted that even if the outage time is 177 ms, that is, even if the input voltage is not inputted to the power cell for 177 ms, the output current of the medium voltage inverter is not stopped and stably driven to allow the current to flow to the motor (40). Referring to FIG. 7b, it can be noted that even if the outage time is 173 ms, that is, even if the input voltage is not inputted to the power cell for 173 ms, the output current of the medium voltage inverter is not stopped and the motor is stably driven to allow the current to flow to the motor (40).

Figure 8A:
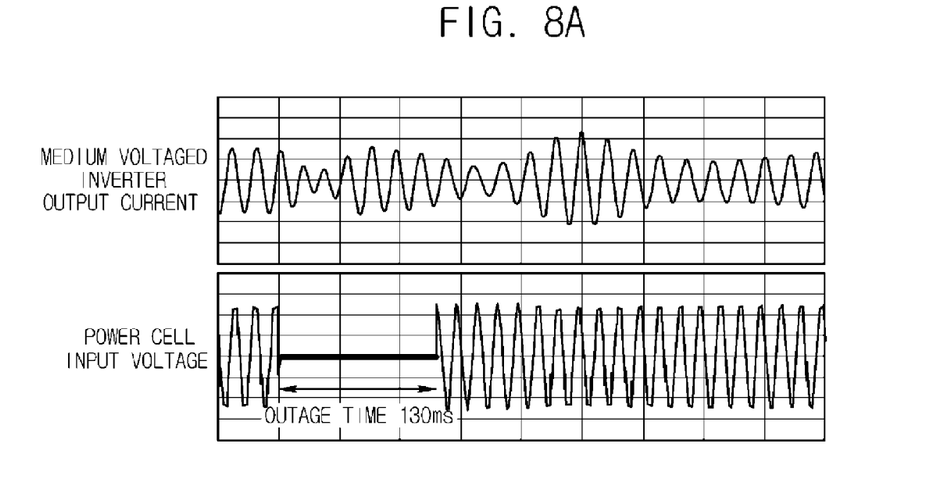
FIGS. 8a and 8b are schematic views illustrating that an output current of a medium voltage inverter is compensated by a method for compensating instantaneous power failure in the medium voltage inverter according to an exemplary embodiment of the present disclosure.
Figure 8B:
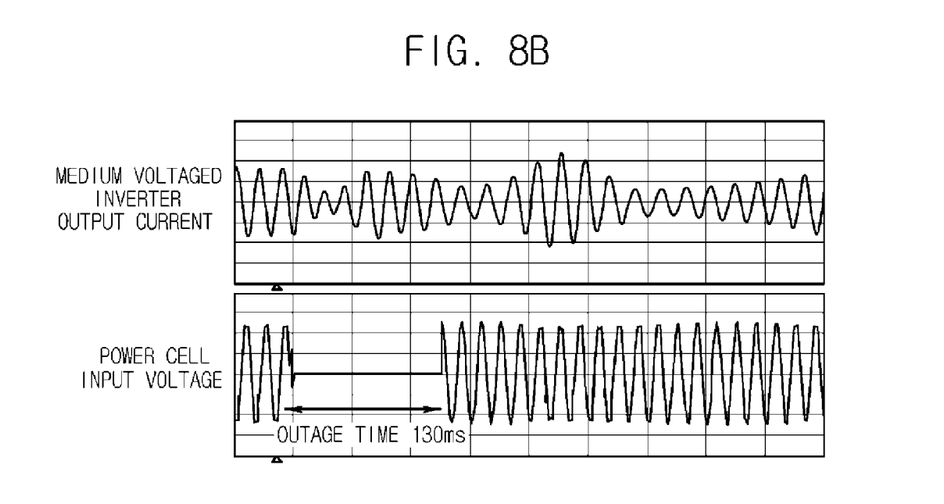

FIGS. 8a and 8b are schematic views illustrating that an output current of a medium voltage inverter is compensated by a method for compensating instantaneous power failure in the medium voltage inverter according to an exemplary embodiment of the present disclosure, where the motor (40) operates at 49 Hz and 51 Hz respectively, in a case the motor (40) has a load amount of 3,000 V.

Referring to FIGS. 8a and 8b, it can be noted that even if the outage time is 130 ms, that is, even if the input voltage is not inputted to the power cell for 130 ms, the output current of the medium voltage inverter is not stopped and the motor is stably driven to allow the current to flow to the motor (40).

As apparent from the foregoing, the method for compensating instantaneous power failure in medium voltage inverter can cope with the instantaneous power failure of over 16 ms which was impossible in the conventional medium voltage inverter of CHB structure.

The method for compensating instantaneous power failure in medium voltage inverter has an industrial applicability in that the inverter can be prevented from damage caused by instantaneous power failure to thereby enhance reliability of product processes and to enhance the quality of product.

Although the present disclosure has been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of subject combination arrangement within the scope of the disclosure, the drawings and the appended claims. In addition to variations and modifications in the component parts and/or arrangements, alternative uses will also be apparent to those skilled in the art.

What is claimed is:
1. A method for controlling an inverter, the inverter including a direct current (DC) capacitor and configured to output a voltage having an output frequency to drive a motor the method comprising:
    detecting an input voltage failure to the inverter when a speed of the motor is less than an output frequency by an amount of a slip frequency;
    decreasing the output frequency to a frequency less than the speed of the motor at the time of detecting the input voltage failure;
    continuing to decrease the output frequency from the frequency less than the speed of the motor such that a frequency decrease according to time is constant;
    detecting a recovery of the input voltage failure; and
    maintaining the decreased output frequency for a prescribed period after detecting the recovery of the input voltage failure.
2. The method of claim 1, further comprising increasing the output frequency according to time after the prescribed period to a frequency before the input voltage failure.
3. The method of claim 1, further comprising:
    increasing the output frequency according to time in response to detecting a voltage increase across the DC capacitor.

4. The method of claim 1, wherein the decreased output frequency is maintained until the speed of the motor is less than the decreased output frequency.

5. A medium voltage inverter system, the system comprising:
- a motor;
- at least one inverter including a DC capacitor and configured to output a voltage having an output frequency to the motor; and
- a controller connected to the inverter and configured to:
- detect an input voltage failure to the inverter when a speed of the rotor is less than the output frequency by an amount of a slip frequency;
- decrease the output frequency to a frequency less than the speed of the motor at the time of detecting the input voltage failure;
- continue to decrease the output frequency from the frequency less than the speed of the motor such that a frequency decrease according to time is constant;
- detect a recovery of the input voltage failure; and
- maintain the decreased output frequency for a prescribed period after detecting the recovery of the input voltage failure.

6. The system of claim 5, wherein the controller is further configured to increase the output frequency according to time after the prescribed period to a frequency before the input voltage failure.

7. The system of claim 5, wherein the controller is further configured to:
- increase the output frequency according to time in response to detecting a voltage increase across the DC capacitor.

8. The system of claim 5, wherein the controller is further configured to maintain the decreased output frequency until the speed of the motor is less than the decreased output frequency.

* * * * *